US011759869B2

(12) United States Patent
No

(10) Patent No.: US 11,759,869 B2
(45) Date of Patent: Sep. 19, 2023

(54) CUTTING INSERT FOR DRILLING

(71) Applicant: TaeguTec, Ltd., Daegu (KR)

(72) Inventor: Kee Young No, Daegu (KR)

(73) Assignee: TaeguTec, Ltd., Daegu (KR)

( * ) Notice: Subject to any disclaimer, the term of this patent is extended or adjusted under 35 U.S.C. 154(b) by 279 days.

(21) Appl. No.: 16/632,558

(22) PCT Filed: Jul. 4, 2018

(86) PCT No.: PCT/KR2018/007546
§ 371 (c)(1),
(2) Date: Jan. 21, 2020

(87) PCT Pub. No.: WO2019/039724
PCT Pub. Date: Feb. 28, 2019

(65) Prior Publication Data
US 2020/0238397 A1    Jul. 30, 2020

(30) Foreign Application Priority Data

Aug. 23, 2017  (KR) .......................... 10-2017-0106510

(51) Int. Cl.
*B23B 51/00* (2006.01)
*B23B 27/14* (2006.01)
*B23B 51/02* (2006.01)

(52) U.S. Cl.
CPC ............ *B23B 51/00* (2013.01); *B23B 27/143* (2013.01); *B23B 51/02* (2013.01);
(Continued)

(58) Field of Classification Search
CPC ..... B23B 51/00; B23B 51/02; B23B 51/0004; B23B 51/0006; B23B 51/0007;
(Continued)

(56) References Cited

U.S. PATENT DOCUMENTS 3,786,541 A * 1/1974 Lundgren ............. B23B 27/143
407/116
4,411,565 A * 10/1983 Hazra ................... B23B 27/143
407/114
(Continued)

FOREIGN PATENT DOCUMENTS

JP       06134611 A  * 10/1992
JP    2000107920 A  *  4/2000
(Continued)

OTHER PUBLICATIONS

International Search Report dated Oct. 12, 2018, issued in counterpart International (PCT) Application (No. PCT/KR2018/007546).
(Continued)

*Primary Examiner* — Nicole N Ramos
(74) *Attorney, Agent, or Firm* — Womble Bond Dickinson (US) LLP

(57) ABSTRACT

A cutting insert for drilling includes an upper surface, a lower surface formed on an opposite side of the upper surface, a side surface connecting the upper surface and the lower surface; a cutting edge formed at an intersection of the upper surface and the side surface, and a ridge portion formed to protrude upward from the upper surface to facilitate chip control. The ridge portion includes a ridge body spaced apart from the cutting edge and disposed at a central portion of the cutting insert for drilling; and a ridge extension portion extending from a vicinity of a corner of the ridge body in a direction parallel to the cutting edge.

21 Claims, 11 Drawing Sheets

(52) U.S. Cl.
CPC . *B23B 2200/0447* (2013.01); *B23B 2200/081* (2013.01); *B23B 2200/321* (2013.01); *B23B 2251/50* (2013.01)

(58) Field of Classification Search
CPC ........ B23B 51/0008; B23B 2200/0404; B23B 2200/0438; B23B 2200/0447; B23B 2200/08; B23B 2200/081; B23B 2200/082; B23B 2200/086; B23B 2200/087; B23B 2200/088; B23B 2200/16; B23B 2200/161; B23B 2200/163; B23B 2200/165; B23B 2200/321; B23C 2200/0405; B23C 2200/0422; B23C 2200/0433; B23C 2200/201; B23C 2200/208; B23C 2200/221; B23C 2200/082
See application file for complete search history.

(56) References Cited

U.S. PATENT DOCUMENTS

| | | | | |
|---|---|---|---|---|
| 4,776,732 | A * | 10/1988 | Hale | B23B 27/141 407/114 |
| 5,007,775 | A * | 4/1991 | Pantzar | B23C 5/202 407/115 |
| 5,122,017 | A * | 6/1992 | Niebauer | B23B 27/143 407/115 |
| 5,791,833 | A * | 8/1998 | Niebauer | B23B 27/141 407/116 |
| 5,803,674 | A | 9/1998 | Satran et al. | |
| 6,039,515 | A * | 3/2000 | Lamberg | B23B 27/141 408/188 |
| 6,079,912 | A * | 6/2000 | Rothballer | B23C 5/2462 407/41 |
| 6,224,300 | B1 * | 5/2001 | Baxivanelis | B23B 27/141 407/33 |
| 6,530,726 | B2 * | 3/2003 | Nelson | B23C 5/202 407/115 |
| 6,935,815 | B2 * | 8/2005 | Schwaner | B23C 5/205 407/116 |
| 7,891,916 | B2 | 2/2011 | Takahashi et al. | |
| 8,157,489 | B2 * | 4/2012 | Wolf | B23B 27/141 407/113 |
| 8,192,113 | B2 * | 6/2012 | Limell | B23B 51/00 407/113 |
| 8,197,163 | B2 * | 6/2012 | Nasu | B23B 27/141 408/223 |
| 10,029,317 | B2 | 7/2018 | Kawasaki | |
| 2002/0146293 | A1 | 10/2002 | Nelson | |
| 2003/0223833 | A1 | 12/2003 | Roman | |
| 2005/0254908 | A1 * | 11/2005 | Norstrom | B23B 27/145 407/113 |
| 2007/0201962 | A1 * | 8/2007 | Limell | B23B 27/1622 408/199 |
| 2008/0181737 | A1 * | 7/2008 | Limell | B23B 27/1614 407/69 |
| 2008/0219791 | A1 | 9/2008 | Nasu et al. | |
| 2009/0060665 | A1 * | 3/2009 | Lof | B23B 27/145 407/116 |
| 2010/0272526 | A1 * | 10/2010 | Dufour | B23B 51/00 407/113 |
| 2010/0329804 | A1 * | 12/2010 | Okumura | B23B 27/141 408/1 R |
| 2011/0044776 | A1 * | 2/2011 | Ishi | B23B 51/02 408/1 BD |
| 2013/0251468 | A1 | 9/2013 | Lof | |
| 2014/0161552 | A1 | 6/2014 | Ramesh | |
| 2014/0212235 | A1 | 7/2014 | Prast et al. | |
| 2015/0023744 | A1 * | 1/2015 | Wu | B23B 27/143 407/116 |
| 2015/0165532 | A1 | 6/2015 | Yamamoto | |
| 2015/0246398 | A1 * | 9/2015 | Kawasaki | B23B 51/00 407/115 |
| 2016/0023282 | A1 * | 1/2016 | Ramesh | B23B 27/141 408/233 |
| 2016/0107248 | A1 * | 4/2016 | Smycek | B23C 5/202 407/115 |
| 2017/0120342 | A1 | 5/2017 | Fujii | |

FOREIGN PATENT DOCUMENTS

| | | | |
|---|---|---|---|
| JP | 2006075913 A * | 3/2006 | |
| JP | 2012-143866 | 8/2012 | |
| KR | 10-2010-0055971 | 5/2010 | |
| WO | WO-2015098646 A1 * | 7/2015 | ......... B23B 27/1622 |

OTHER PUBLICATIONS

Written Opinion dated Oct. 12, 2018, issued in counterpart International (PCT) Application (No. PCT/KR2018/007546).

Office Action dated Nov. 3, 2020, issued in counter-part Chinese application (No. 201880054551.2).

Extended European Search Report dated Apr. 13, 2021, in EP counterpart application No. 18848363.0.

Notice of Allowance dated Apr. 9, 2022, in Korean counterpart application No. 10-2017-0106510, with English translation.

Office Action dated Apr. 5, 2022, in Japanese counterpart application No. 2020-511167, with English translation.

* cited by examiner

CUTTING INSERT FOR DRILLING

RELATED APPLICATIONS

This is a 35 USC 371 U.S. National Phase of International Application No. PCT/KR2018/007546 filed 4 Jul. 2018 and published as WO 2019/039724A1 on Feb. 28, 2019. Priority is claimed to Korean application no. 10-2017-0106510 filed Aug. 23, 2017. The contents of the aforementioned applications are incorporated by reference in their entirety.

TECHNICAL FIELD

The present invention relates to a cutting insert for drilling, and more particularly to a shape of a cutting insert for drilling capable of performing chip control more efficiently in processing of a difficult-to-cut material such as stainless steel (SUS) and mild steel, and hole making.

BACKGROUND ART

A drilling tool has been known which has a drill body on which a plurality of interchangeable cutting inserts for drilling are mounted and which is rotatable about a longitudinal axis for drilling into a solid metal material. In this case, the cutting insert for drilling has a symmetrical shape and is indexable such that a plurality of edges can be sequentially used.

For example, WO 03/099494 A1 discloses a drilling tool comprising a main body and two cutting inserts, wherein one cutting insert forms a central insert and the other cutting insert forms an edge insert. An active cutting edge of each of the central insert and the edge insert in use protrudes axially beyond the main body, which allows a chip to be removed from a workpiece when the drilling tool is actuated.

In a conventional cutting insert 10 for drilling as shown in FIG. 1, a cutting edge 12 is formed along the edge of the upper surface of the cutting insert 10 for drilling. Further, a chip former 15 disposed corresponding to the cutting edge 12 is provided between the cutting edge 12 and a central hole 14 for control (chip control) of a chip C generated from the workpiece to be drilled. The chip former is a region which is formed in four directions along the cutting edge 12 and substantially lower than a upper surface 16. In this case, the chip control performance may vary depending on the hardness of the workpiece, a width W1 of the chip former 15 and the like.

Particularly, when a workpiece to be processed by the cutting insert 10 for drilling is made of a material such as mild steel or stainless steel or a hole making process is performed by the cutting insert 10 for drilling, it can generally be seen as a difficult-to-cut situation that chip control is difficult.

Thus, processing of a difficult-to-cut material generally uses a cutting insert 20 for drilling with a chip former 25 that is wider than a conventional insert, as shown in FIG. 2, to improve chip control. In the cutting insert 20 for drilling, since the chip former 25 has a larger width W2, the chip control performance for the chip C generated from the difficult-to-cut material can be improved.

On the other hand, an effective length D1 (i.e., an effective chip control area) of the upper surface of the cutting insert 20 for drilling capable of performing chip control for the generated chip C is reduced as the width W2 becomes larger. Since D2 shown in the indexable cutting insert of FIG. 2 has substantially the same size as W2, increasing W2 means that D2 becomes larger. At the position indicated by D2 in the chip former 25, since the chip former 25a is disposed in parallel with a direction in which the chip enters, it cannot perform a chip control function.

For this reason, when the width of the chip former 25 increases, the chip control performance of the difficult-to-cut material is improved. However, since the width of a portion parallel to the direction in which the chip enters, that is, a portion where chip control is not performed, also increases, the chip control performance is not improved as a whole or the degree of improvement is small due to a cancellation effect, which is problematic.

DISCLOSURE OF INVENTION

Technical Problem

In view of the above, aspects of the present invention provide a cutting insert for drilling capable of eliminating the above-described side effects even if the width of a chip former is widened in order to improve the chip control performance.

Aspects of the present invention also provide a drilling tool for mounting a plurality of cutting inserts for drilling in which the arrangement among the plurality of cutting inserts for drilling is optimized to improve the chip control performance that occurs in a drilling process.

However, aspects of the present invention are not restricted to those set forth herein. The above and other aspects of the present invention will become more apparent to one of ordinary skill in the art to which the present invention pertains by referencing the detailed description of the present invention given below.

Solution to Problem

According to an aspect of the present invention, there is provided a cutting insert for drilling, comprising: an upper surface; a lower surface formed on an opposite side of the upper surface; a side surface connecting the upper surface and the lower surface; a cutting edge formed at an intersection of the upper surface and the side surface; and a ridge portion formed to protrude upward from the upper surface to facilitate chip control, wherein the ridge portion includes: a ridge body spaced apart from the cutting edge and disposed at a central portion of the cutting insert for drilling; and a ridge extension portion extending from a vicinity of a corner of the ridge body in a direction parallel to the cutting edge.

According to another aspect of the present invention, there is provided a drilling tool comprising: a drill body rotatable about a longitudinal axis; and at least one inner cutting insert and at least one outer cutting insert identical to the inner cutting insert and disposed outwardly in a radial direction, each of the inner cutting insert and the outer cutting insert, comprising: an upper surface; a lower surface formed on an opposite side of the upper surface;

a side surface connecting the upper surface and the lower surface; a cutting edge formed at an intersection of the upper surface and the side surface; and a ridge portion formed to protrude upward from the upper surface to facilitate chip control, wherein the ridge portion includes: a ridge body spaced apart from the cutting edge and disposed at a central portion of the cutting insert; and a ridge extension portion extending from a vicinity of a corner of the ridge body in a direction parallel to the cutting edge.

Advantageous Effects of Invention

According to an indexable cutting insert for drilling according to the present invention, it is possible to increase the width of a chip former so as to be suitable for processing a difficult-to-cut material and minimize a reduction in an effective chip control area due to such an increase in the width of the chip former.

According to a drilling tool according to the present invention, it is possible to optimize the arrangement among a plurality of cutting inserts for drilling mounted on the drilling tool to hide a non-use area in the cutting insert for drilling that interferes with effective chip control, thereby improving the drilling performance.

MODE FOR THE INVENTION

Figure 1:
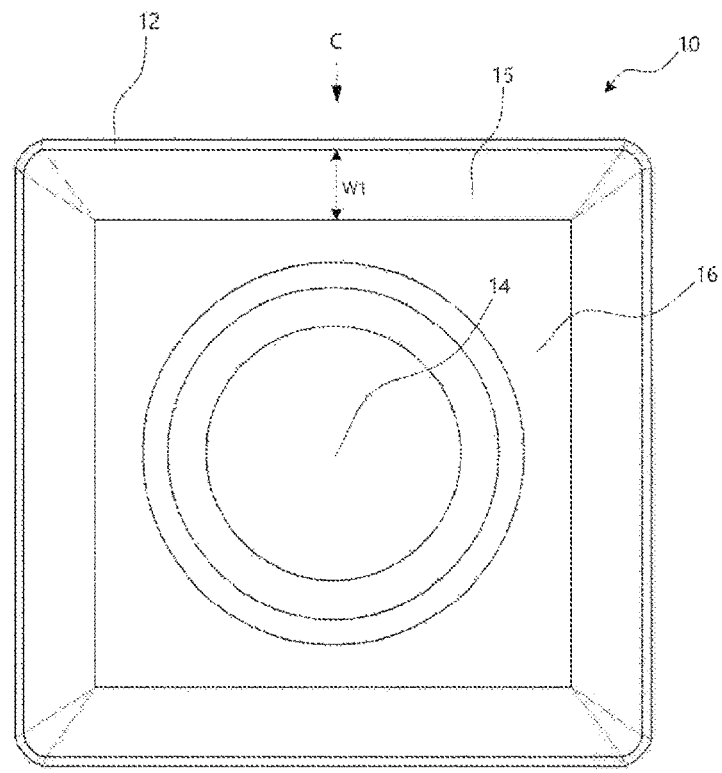
FIG. 1 is a plan view showing a general cutting insert for drilling according to the prior art.
Figure 2:
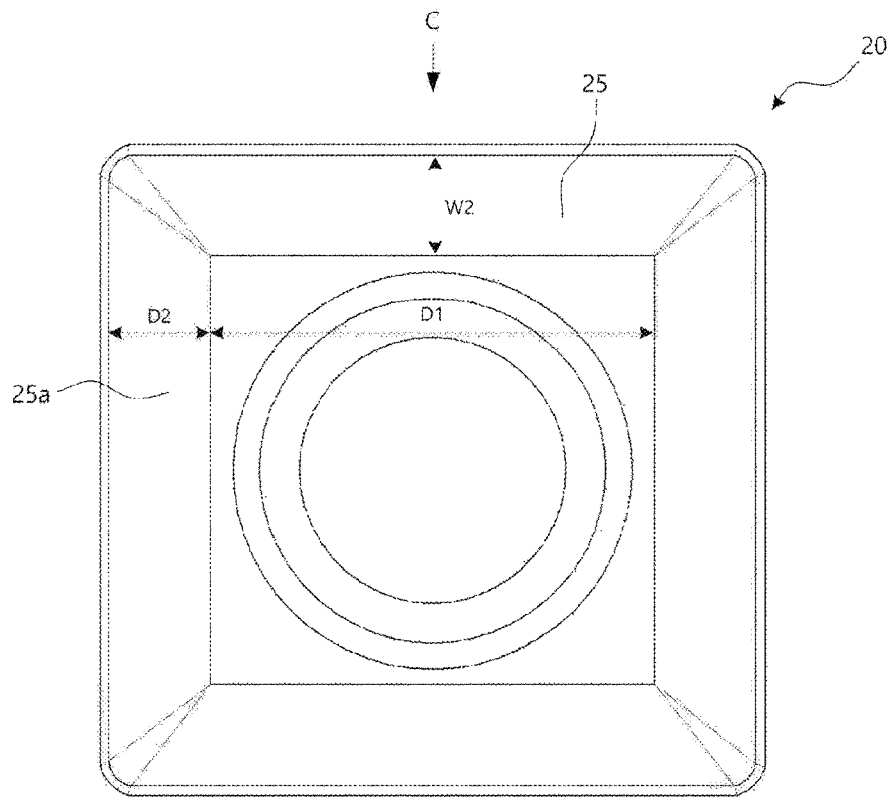
FIG. 2 is a plan view showing a cutting insert for drilling in use for processing a difficult-to-cut material according to the prior art.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Throughout the specification, like reference numerals in the drawings denote like elements.

Hereinafter, embodiments of the present invention will be described in detail with reference to the accompanying drawings.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, do not preclude the presence or addition of one or more other components.

Figure 3:
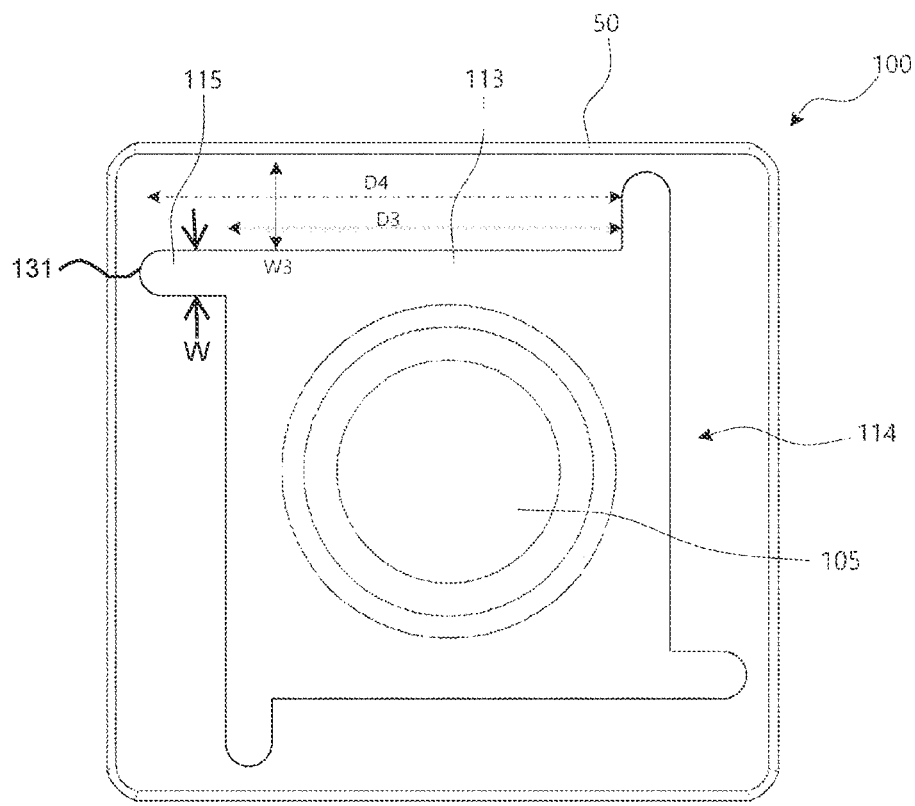
FIG. 3 is a plan view showing a shape of a ridge portion for chip control in a cutting insert for drilling according to an embodiment of the present invention.

FIG. 3 is a plan view showing a shape of a ridge portion 114 for chip control in a cutting insert 100 for drilling according to an embodiment of the present invention.

The cutting insert 100 for drilling according to an embodiment of the present invention has a peripherally extending cutting edge 49 comprising a plurality of indexable cutting edges 50. Further, the ridge portion 114 of the cutting insert 100 for drilling includes a ridge body 113 having a closed curve shape to surround a central bore 105 and a ridge extension portion 115 extending from the corner of the ridge portion 113 toward each of the cutting edges 50. As seen in the plan view of FIG. 5, the ridge extension portion 115 is asymmetric about an insert corner bisector B1 passing through the corner cutting edge and the center of the insert. In the cutting insert 100 for drilling according to an embodiment of the present invention, even if a width W3 of a chip former is sufficiently increased, an effective chip control area is increased from D3, which is a conventional value, to D4 by adding the ridge extension portion 115. Therefore, as the width of the ridge portion 114 becomes sufficiently large by providing the ridge extension portion 115, the effective chip control area D4 can be sufficiently secured while facilitating chip control of a difficult-to-cut material. Thus, it is possible to eliminate side effects caused by an increase in the width W3 of the chip former. That is, a chip generated in the cutting edge 50 is allowed to climb over the extended ridge portion 113, thereby expanding an area where chip control can be performed.

Figure 4:
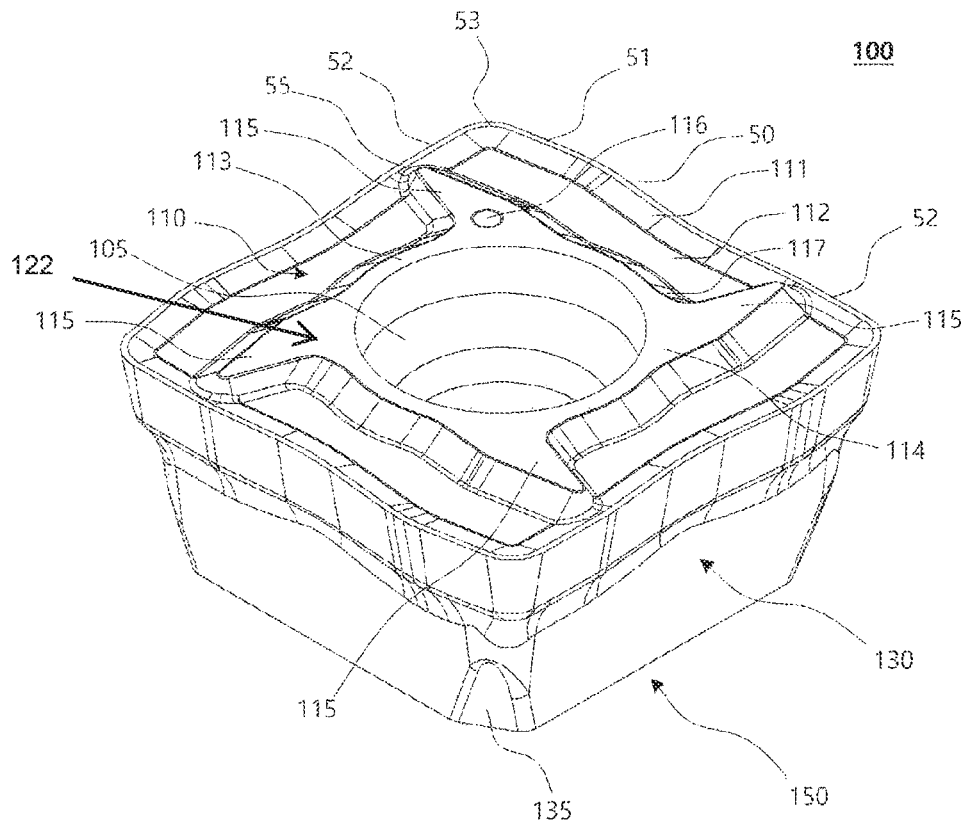
FIG. 4 is a perspective view of a cutting insert for drilling according to an embodiment of the present invention.
Figure 5:
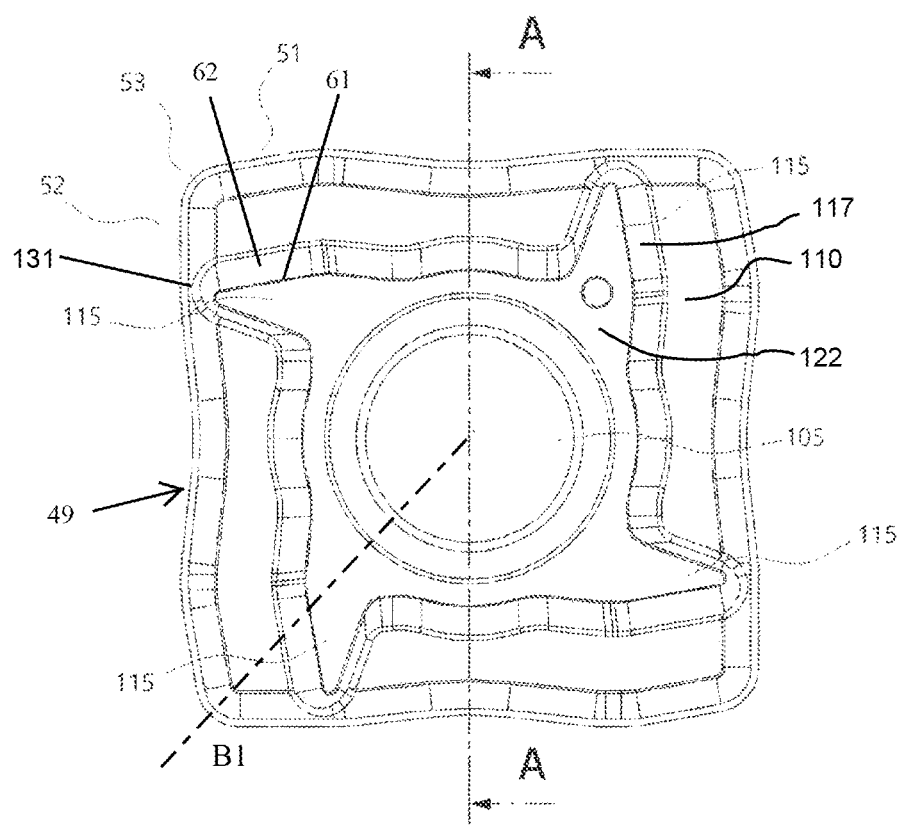
FIG. 5 is a plan view of the cutting insert for drilling of FIG. 4.
Figure 6:
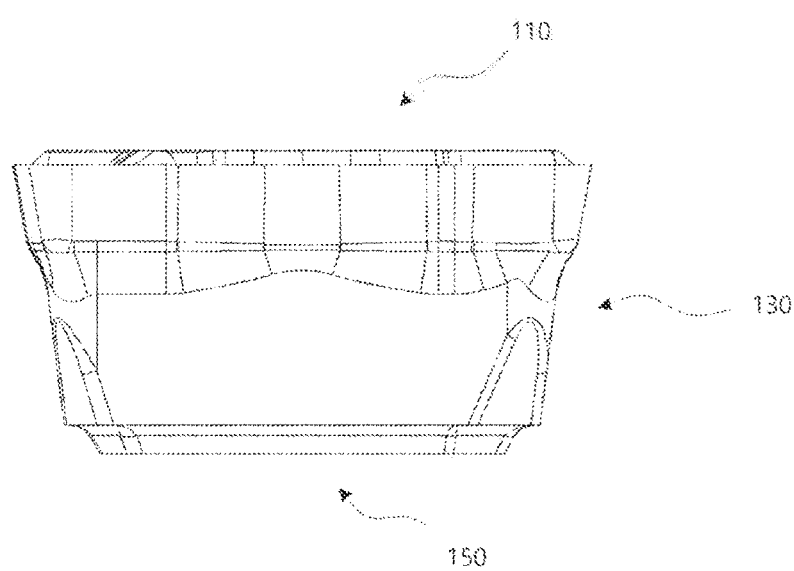
FIG. 6 is a side view of the cutting insert for drilling of FIG. 4.
Figure 7:
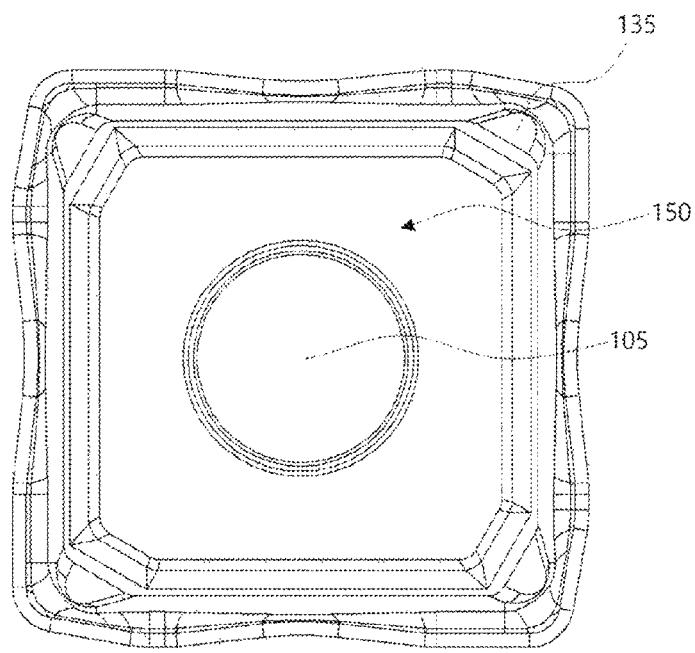
FIG. 7 is a bottom view of the cutting insert for drilling of FIG. 4.
Figure 8:
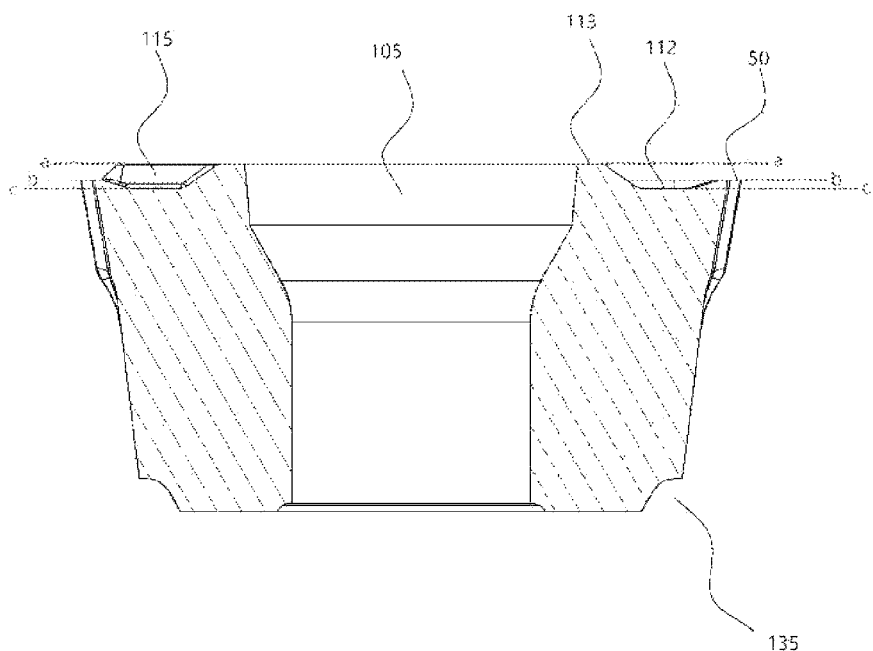
FIG. 8 is a cross-sectional view taken along line A-A' in FIG. 5.

FIG. 4 is a perspective view of a cutting insert 100 for drilling according to an embodiment of the present invention. FIG. 5 is a plan view of the cutting insert 100 for drilling FIG. 6 is a side view of the cutting insert 100 for drilling FIG. 7 is a bottom view of the cutting insert 100 for drilling FIG. 8 is a cross-sectional view taken along line A-A' in FIG. 5. Hereinafter, the structure and function of the cutting insert 100 for drilling according to an embodiment of the present invention will be described with reference to FIGS. 4 to 8.

The cutting insert 100 for drilling may be configured to include an upper surface 110, a lower surface 150 formed on the opposite side of the upper surface 110, a side surface 130 connecting the upper surface 110 and the lower surface 150, the cutting edge 50 formed at an intersection of the upper surface 110 and the side surface, and the ridge portion 114 formed to protrude upward from the upper surface 110 to facilitate chip control. A notch 116 serving as a reference marker in replacing a necessary cutting edge in the indexable cutting insert 100 for drilling is formed on one side of the ridge portion 114.

Figure 12:
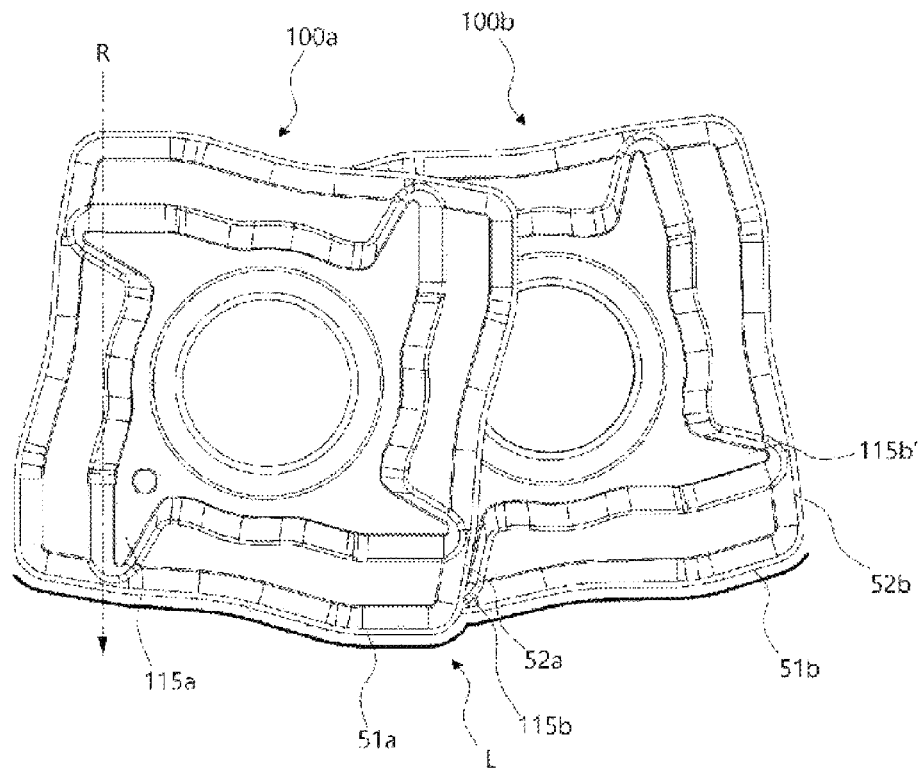
FIG. 12 is a view showing an inner cutting insert and an outer cutting insert, which overlap each other along the radius of rotation.

The cutting edge 50 includes a major cutting edge 51 serving as a main part when cutting a workpiece, a minor cutting edge 52 serving as an auxiliary part during the cutting, and a corner cutting edge 53 connecting the both parts. As shown in FIG. 12 (to be described later), major cutting edges 51a and 51b are disposed adjacent to the drilling surface to perform a main cutting function, while minor cutting edges 51b and 52b are disposed perpendicular to the drilling surface to perform an auxiliary cutting function. An inclined surface 111 having a downward inclination from the cutting edge 50 toward the inside of the upper surface 110 is formed in order to impart a cutting angle to the cutting edge 50. The inner end of the inclined surface 111 is adjacent to a bottom surface 112 of the upper surface 110. The inclined surface 111 of the cutting edge 50, the bottom surface 112 and an inclined surface 117 formed on the ridge portion 114 form a chip former which is recessed downward from the cutting edge 50 and the ridge portion 114. In some cases, a chip former may be formed without the inclined surface 111.

Specifically, the ridge portion 114 includes the ridge body 113 having a closed curve shape when the upper surface 110 is viewed from the top, and the ridge extension portion 115 extending from the corner of the ridge body 113 toward the cutting edge 50. It is preferable that the ridge extension portion 115 has the same height as the ridge body 113. Specifically, the ridge extension portion 115 extends toward the minor cutting edge 52 in a direction perpendicular to the minor cutting edge 52 and parallel to the major cutting edge 51. Thus, since the ridge extension portion 115 extends in a direction perpendicular to the minor cutting edge 52 and parallel to the major cutting edge 51, when the chip generated by cutting by the major cutting edge 51 enters in a direction perpendicular to the major cutting edge 51, appropriate chip control can be achieved by the ridge extension portion 115. As seen in the plan view of FIG. 5, the ridge extension portion 115 has a proximate edge 61 which borders a proximate inclined surface 62. The proximate edge 61 and the proximate inclined surface 62 face the major cutting edge 51, are spaced apart therefrom by the chip former. Along their entire lengths, the proximate edge 61 and the proximate inclined surface 62 are parallel to the major cutting edge 51 and extend to a vicinity of the associated minor cutting edge 51.

However, in order not to interrupt the continuity of the cutting edge 50, a gap space 55 is formed between the end of the ridge extension portion 115 and the minor cutting edge 52. This gap space 55 prevents even a portion of the cutting edge 50a from losing a cutting function.

In order to improve the chip control performance at the corner of the minor cutting edge 52, it is preferable that the ridge extension portion 115 is formed to have a width W decreasing from the ridge body 113 toward the end 131 of the ridge extension portion 115. As seen in the plan view of FIG. 3, the width W is measured perpendicular to the major cutting edge 51 to which the ridge extension portion 115 is parallel. Further, it is preferable that the ridge portion 114 entirely has a shape in which the cross section of the ridge portion 114 increases from the upper side 122 of the ridge portion 114 to the upper surface 110 from which the ridge portion 114 protrudes so that the introduced chip can smoothly climb over the inclined surface 117 of the ridge portion 114. Restated, and as seen in FIGS. 4 and 5, by virtue of the inclined portion 117, the ridge portion 114 has a shape which tapers in an upward direction from the upper surface 110 of the cutting insert to the upper side 122 of ridge portion 114.

As shown in FIGS. 4 and 5, the ridge body 113 is configured to surround the bore 105 passing through from the upper surface 110 to the lower surface 150. The bore 105 is a component necessary for fixing to a pocket formed in a drill body by a screw. In addition, a concave groove 135 is formed at the corner near the lower surface 150 of the cutting insert 100 for drilling to facilitate positioning when the cutting insert 100 for drilling is fixed to the pocket.

In one embodiment of the present invention, the edge of the bore 105 coincides with the inner closed curve of the ridge body 113. That is, there are no bends or irregularities between the edge of the bore 105 and the ridge body 113. Therefore, it is possible to simplify the structure of the cutting insert 100 for drilling and to secure a space of a sufficient size for the bore 105 in the upper surface 110, and without having to separately form a downward inclined surface toward the inside of the ridge body 113, the edge portion of the bore 105 itself can perform its role.

As described above, according to the present invention, since the effective chip control area is increased by the ridge extension portion 115 extending from the ridge body 113, the chip control performance can be improved while sufficiently securing the widths of the chip formers 111, 112 and 117 in a drilling process using the insert 100.

In order to further improve the chip control performance, it is most preferable that the chip former has a groove or a groove shape, and it is necessary to satisfy a specific height condition between the cutting edge 50, the bottom surface 112, which is the bottom surface of the chip former, and the ridge portion 114 including the ridge body 113 and the ridge extension portion 115. Referring to FIG. 8, the ridge body 113 and the ridge extension portion 115 has the same height a which is higher than the cutting edge 50 and the bottom surface 112 of the chip former, and the cutting edge 50 is higher than the bottom surface 112 of the groove. Therefore, a relationship "a>b>c" is established between the height a of the ridge portion 114, the height b of the cutting edge 50, and the height c of the bottom surface 112 of the chip former.

Due to such a height relationship, the chip generated from the workpiece in the vicinity of the cutting edge 50 in the drilling process is moved upward while sequentially passing through the chip former 112 and the ridge portion 114, thereby achieving a preferable chip control.

Figure 9:
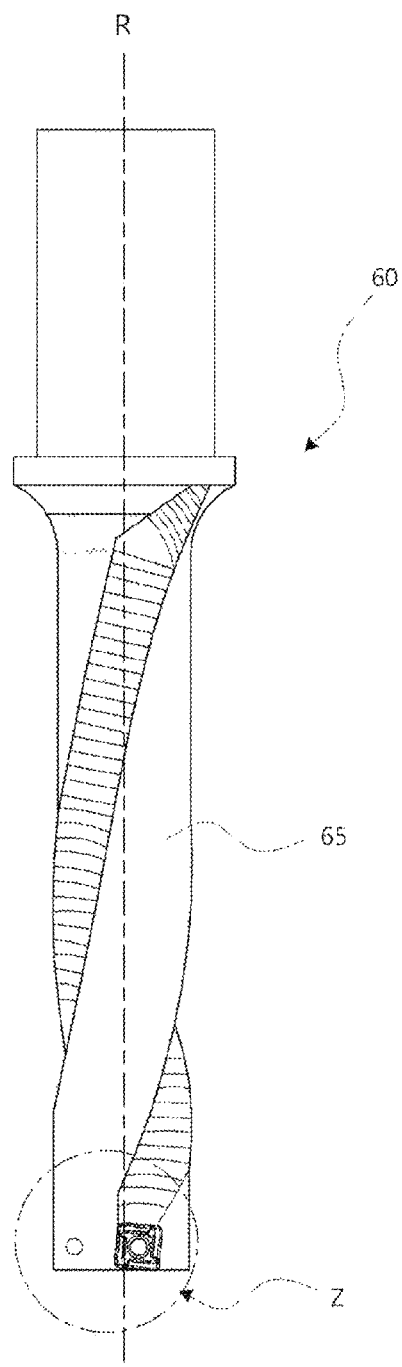
FIG. 9 shows an overall shape of a drilling tool in which two cutting inserts for drilling are arranged.
Figure 10:
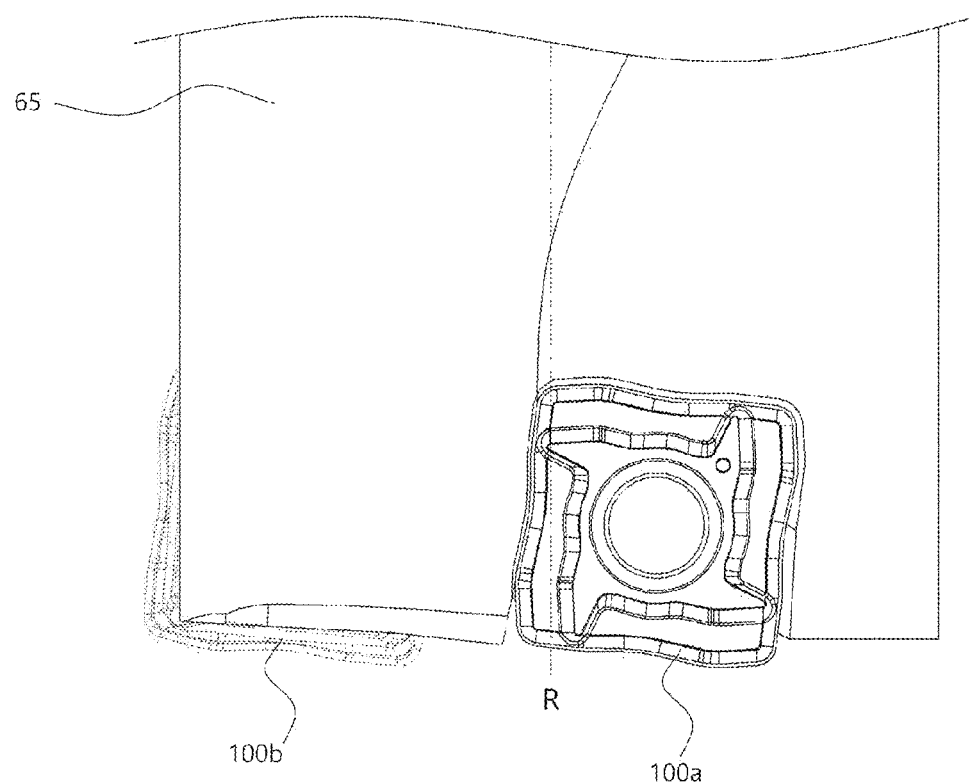
FIG. 10 is an enlarged view of an end portion of the drilling tool of FIG. 9 in which the cutting inserts for drilling are arranged.

Hereinafter, a drilling tool 60 having two cutting inserts 100 for drilling as described above will be described. FIG. 9 shows the overall shape of the drilling tool 60 in which two cutting inserts 100 for drilling are arranged. FIG. 10 is an enlarged view of an end portion Z of the drilling tool 60 of FIG. 9 in which the cutting inserts 100 for drilling are arranged.

The drilling tool 60 includes a drill body 65 rotatable about a longitudinal axis R for drilling. The drill body 65 has two receiving portions for receiving one cutting insert 100 for drilling in each case. One of the two receiving portions serves as an inner receiving portion and the other receiving portion serves as an outer receiving portion. The receiving portion has in particular a threaded bore for receiving a screw guided through the bore 105 in each cutting insert 100 for drilling in each case. In addition, the receiving portion may have one or several contact surfaces in each case, so that the cutting insert 100 received therein can be supported in a form-fitting manner.

Figure 11:
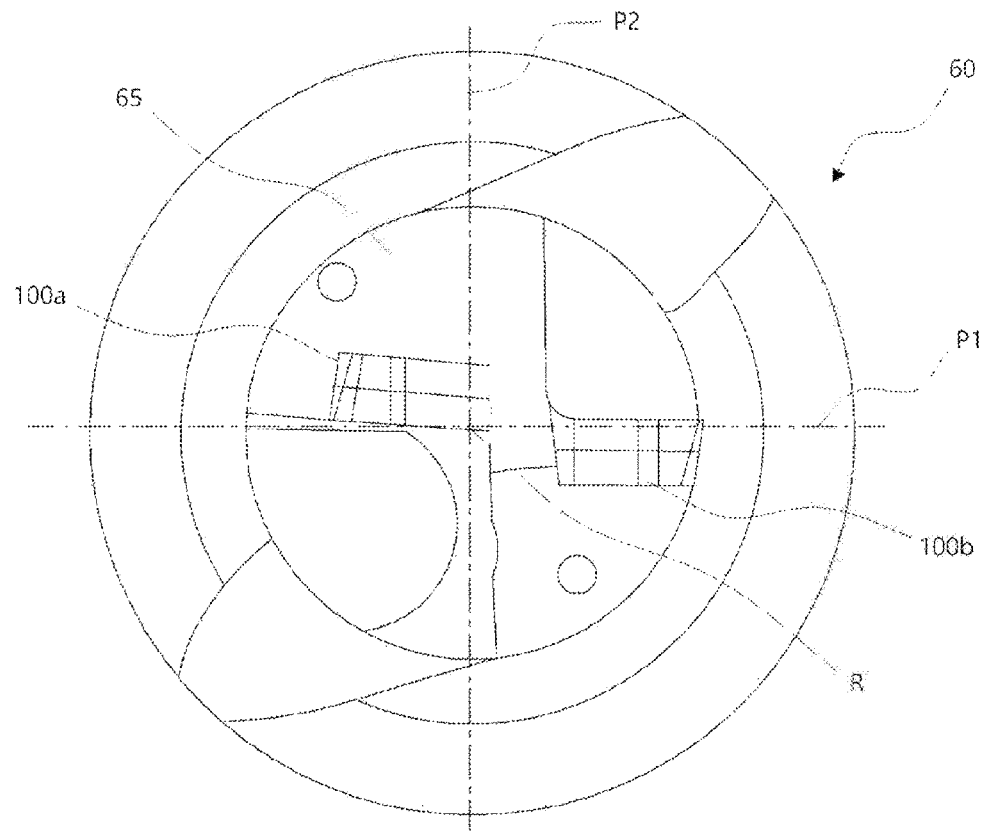
FIG. 11 shows a plan view of the axial end of the drilling tool along a longitudinal axis.

FIG. 11 shows a plan view of the axial end of the drilling tool 60 along the longitudinal axis R. The first cutting insert 100 for drilling is fastened onto the drill body 65 as an inner cutting insert 100a and the second cutting insert 100 for drilling which is the same as the first cutting insert 100 is fastened onto the drill body 65 as an outer cutting insert 100b. The inner cutting insert 100a and the outer cutting insert 100b are disposed in a first plane P1 substantially including the longitudinal axis R with different radial distances from the longitudinal axis R. Further, a second plane P2 including the longitudinal axis R extends perpendicularly to the first plane P1 and the inner cutting insert 100a may be arranged such that its inner portion intersects the second plane P2.

The outer cutting insert 100b is disposed slightly ahead of the first plane P1 with respect to rotation about the longitudinal axis R when the active cutting edge protruding beyond the drill body 65 in the axial direction extends at least substantially parallel to the first plane P1 and the drilling tool 60 is actuated. Thus, the inner cutting insert 100a and the outer cutting insert 100b are arranged at different radial positions with respect to rotation about the longitudinal axis R when the drilling tool 60 is actuated, and are displaced about half a turn with respect to each other.

FIG. 12 is a view showing the inner cutting insert 100a and the outer cutting insert 100b arranged as shown in FIGS. 10 and 11, which overlap each other along the radius of rotation. In this case, the active cutting edge of the inner cutting insert 100a and the active cutting edge of the outer cutting insert 100b are combined to form a composite cutting edge L. Here, the active cutting edge means a cutting edge among indexable cutting edges 52 for drilling, which is currently installed and directly used for structural drilling FIG. 12 shows the cutting edges provided below the inner and outer cutting inserts 100a and 100b, which form the composite cutting edge L.

The inner cutting insert 100a is mounted on the drill body 65 such that a ridge extension portion 115a formed in the inner cutting insert 100a is adjacent to the longitudinal axis and has a direction parallel to the longitudinal axis. When the inner cutting insert 100a and the outer cutting insert 100b overlap each other in the rotation direction, the outer cutting insert 100b is positioned such that a ridge extension portion 115b formed in the outer cutting insert 100b is overlapped and covered by the inner cutting insert 100a.

Thus, since the ridge extension portion 115a perpendicular to the active cutting edge, which may interfere with chip control or chip disposal in the inner cutting insert 100a, is adjacent to the longitudinal axis R (rotational speed is close to 0), it is located in an area that does not affect cutting. Also, since the ridge extension portion 115b perpendicular to the active cutting edge, which may interfere with chip control or chip disposal in the outer cutting insert 100b, is covered by the inner cutting insert 100a that leads the drilling process and is not substantially involved in cutting, no problem occurs either. Due to the planned arrangement of the inner cutting insert 100a and the outer cutting insert 100b, even some of the areas that could adversely affect chip control are placed close to the longitudinal axis R or hidden by the leading cutting insert. Accordingly, it is possible to generally eliminate problems that adversely affect chip control.

Meanwhile, the drilling rotation speed becomes maximum at a major cutting edge 51b farthest from the longitudinal axis R in the outer cutting insert 100b. Therefore, the control of the chip formed by cutting at the furthest major cutting edge 51b may be the biggest problem. This is because chip curling of the workpiece is not performed smoothly and the chip is elongated as the cutting speed is increased. This phenomenon is more conspicuous when the workpiece is made of soft mild steel. However, according to the present invention, since a ridge extension portion 115b' is formed corresponding to the major cutting edge 51b, chip curling and chip cutting can be performed smoothly even at a position having a maximum rotation speed.

Meanwhile, the composite cutting edge L more protrudes in the drilling direction (downward) at a portion (center portion of the composite cutting edge L) where the active cutting edge of the inner cutting insert 100a and the active cutting edge of the outer cutting insert 100b overlap each other than the vicinity of the longitudinal axis R and the outside of the active cutting edge of the outer cutting insert 100b. Accordingly, the central portion of the composite cutting edge L serves as a tip in the drilling process.

So for, the embodiment of the present invention in which the cutting insert 100 has a substantially square shape has been described. However, it is also possible to provide a variety of modified cutting inserts without departing from the scope of the present invention. Hereinafter, various modified embodiments will be described.

Figure 13A:
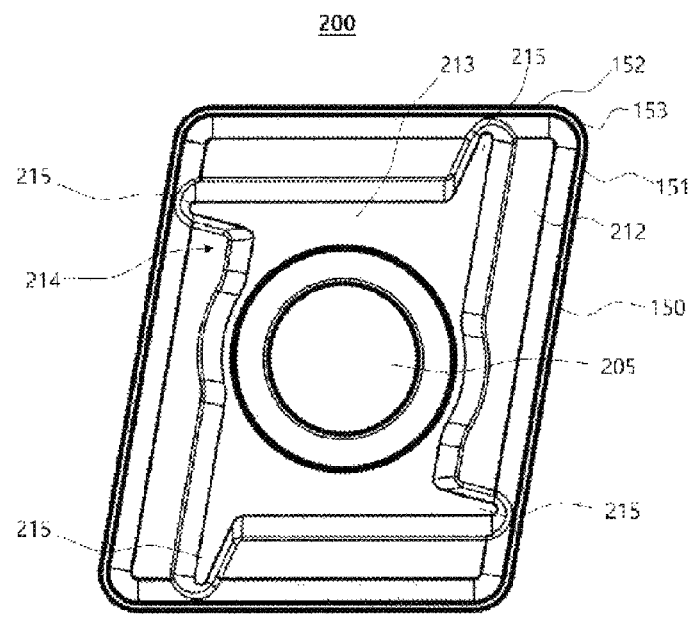
FIGS. 13A to 13C are views showing a cutting insert and a drilling tool according to a second embodiment of the present invention.
Figure 13B:
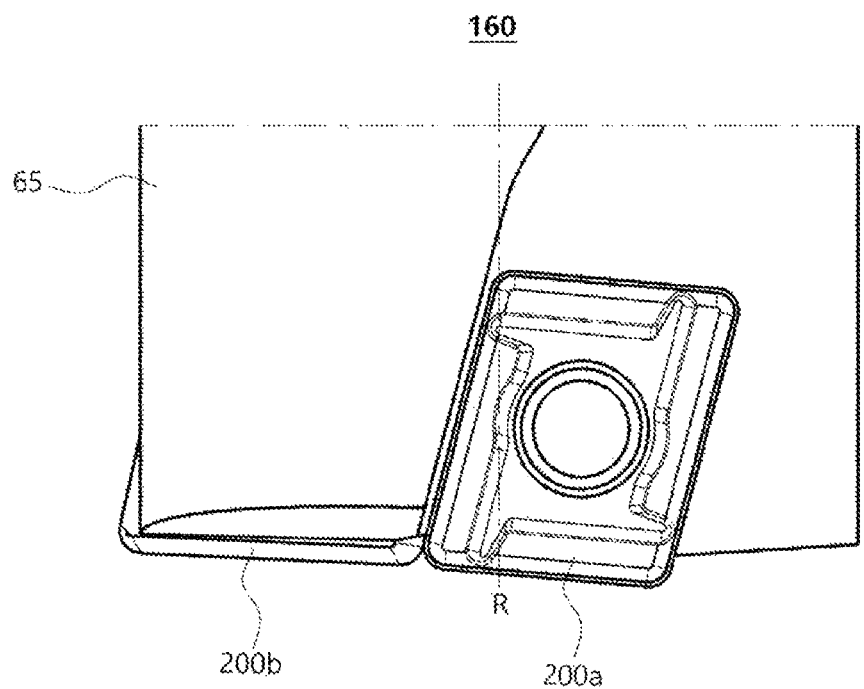
Figure 13C:
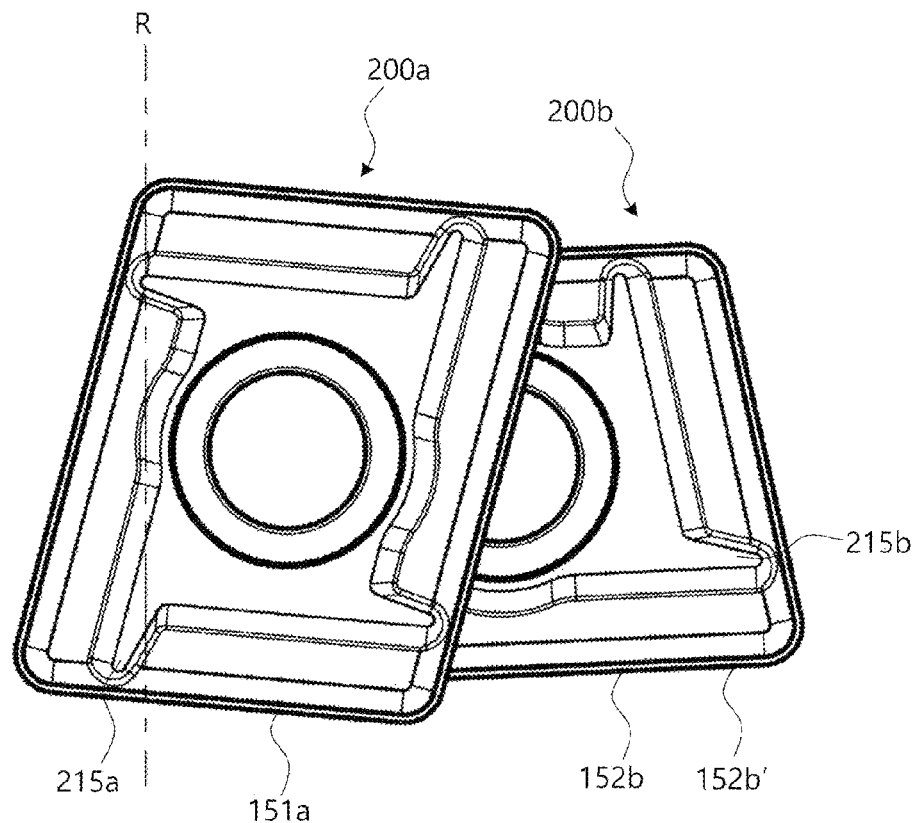

FIGS. 13A to 13C are views showing a cutting insert and a drilling tool according to a second embodiment of the present invention. FIG. 13A is a plan view of a cutting insert 200 having a substantially parallelogram shape.

The cutting insert 200 also includes a ridge portion 214 formed to protrude upward from the upper surface, and the ridge portion 214 includes a ridge body 213 disposed at a central portion 205 of the cutting insert and spaced apart from the cutting edge 150 and a ridge extension portion 215 extending from the vicinity of the corner of the ridge body 213 in a direction parallel to the cutting edge 150, in particular, the first cutting edge 151. Here, the ridge body 213 and the ridge extension portion 215 preferably have the same height with respect to the upper surface.

It is more preferable for controlling the chip cut and discharged by the first cutting edge 151 that a chip former 212 lower than the cutting edge 150 and the ridge extension portion 215 with respect to the upper surface is formed between the cutting edge 150, particularly, the first cutting edge 151 and the ridge extension portion 215 extending parallel to the first cutting edge 151, and the ridge extension portion 215 is formed to be higher than the cutting edge 150 with respect to the upper surface.

The cutting edge 150 includes a first cutting edge 151 and a second cutting edge 152 connected to the first cutting edge 151 at a corner cutting edge 153. The ridge extension portion 215 extends toward the second cutting edge 152 in a direction parallel to the first cutting edge 151 so that curling of the chip cut and discharged by the first cutting edge 151 can be smoothly performed.

FIG. 13B is an enlarged view of an end portion of a drilling tool 160 in which the cutting insert 200 according to the second embodiment of the present invention is disposed. FIG. 13C is a view showing an inner cutting insert 200a and an outer cutting insert 200b which are overlapped along the radius of rotation in the drilling tool 160 of FIG. 13B.

An active cutting edge 151a of the inner cutting insert 200a and an active cutting edge 152b of the outer cutting insert 200b are overlapped and combined to form a composite cutting edge. In this case, the outer cutting insert 200b is disposed such that at least a portion 152b' of the active cutting edge 152b of the outer cutting insert 200b farthest from the longitudinal axis R is parallel to a ridge extension portion 215b of the outer cutting insert 200b.

Further, since the ridge extension portion 215a formed in the inner cutting insert 200a is adjacent to the longitudinal axis R and has a direction substantially parallel to the longitudinal axis R (i.e., the rotation speed is close to 0), it does not substantially affect the drilling process. Further, when the inner cutting insert 200a and the outer cutting insert 200b are overlapped in the rotation direction, a ridge extension portion (not shown) formed in the outer cutting insert 200b in a direction substantially parallel to the longitudinal axis R is overlapped and covered by the inner cutting insert 200a. Thus, the ridge extension portion, which may interfere with chip control in the outer cutting insert 200b, is not involved in cutting during the drilling process.

Figure 14A:
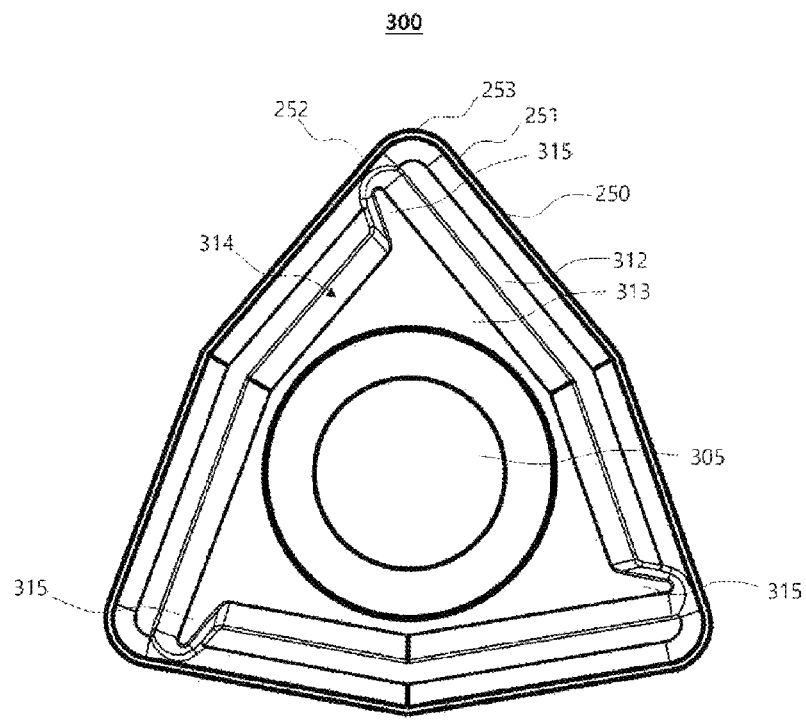
FIGS. 14A to 14C are views showing a cutting insert and a drilling tool according to a third embodiment of the present invention.
Figure 14B:
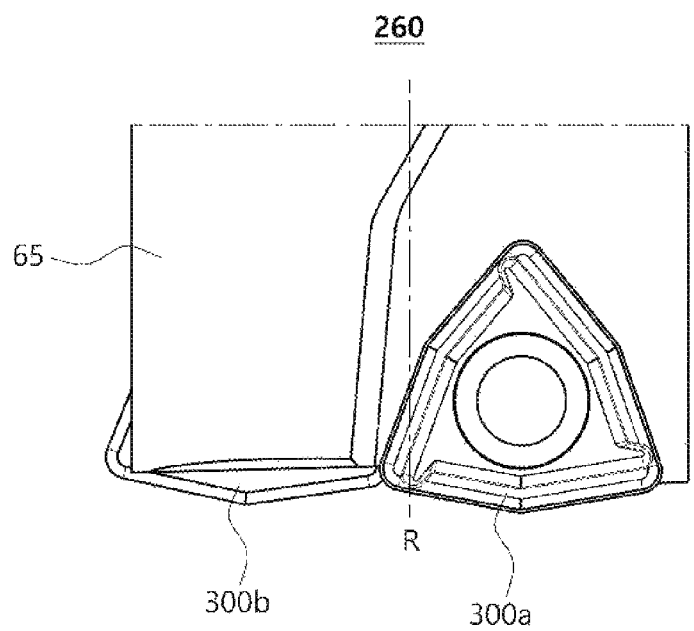
Figure 14C:
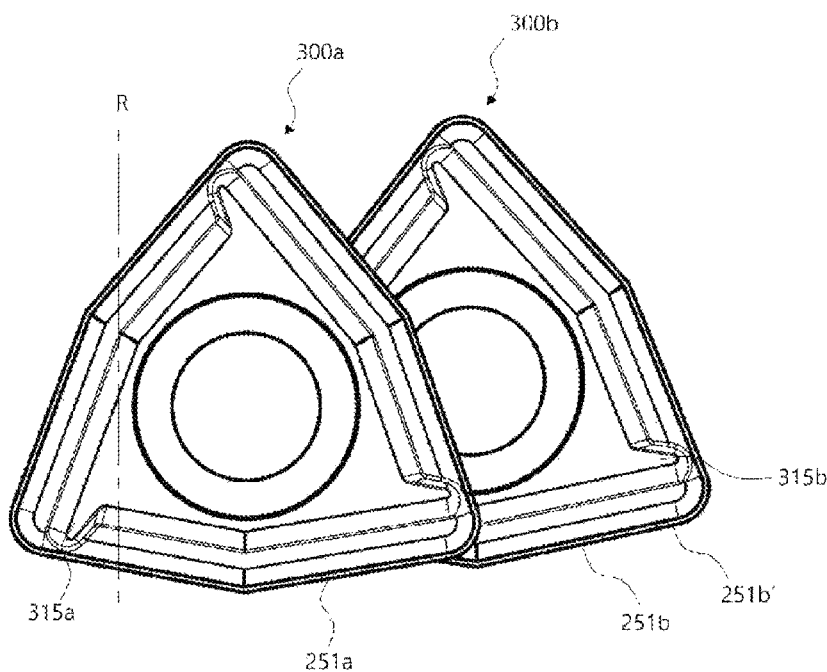

FIGS. 14A to 14C are views showing a cutting insert and a drilling tool according to a third embodiment of the present invention. FIG. 14A is a plan view of a cutting insert 300 having a hexagonal shape.

The cutting insert 300 also includes a ridge portion 314 formed to protrude upward from the upper surface, and the ridge portion 314 includes a ridge body 313 spaced apart from the cutting edge 250 and disposed in a central portion 305 of the cutting insert and a ridge extension portion 315 extending from the vicinity of the corner of the ridge body 313 in a direction parallel to the cutting edge 250, in particular, a first cutting edge 251. Here, the ridge body 313 and the ridge extension portion 315 preferably have the same height with respect to the upper surface.

It is more preferable for controlling the chip cut and discharged by the first cutting edge 251 that a chip former 312 lower than the cutting edge 250 and the ridge extension portion 315 with respect to the upper surface is formed between the cutting edge 250, particularly, the first cutting edge 151 and the ridge extension portion 315 extending parallel to the first cutting edge 251, and the ridge extension portion 315 is formed to be higher than the cutting edge 250 with respect to the upper surface.

The cutting edge 250 includes the first cutting edge 251 and a second cutting edge 252 connected to the first cutting edge 251 at a corner cutting edge 253. The ridge extension portion 315 extends toward the second cutting edge 252 in a direction parallel to the first cutting edge 251 so that curling of the chip cut and discharged by the first cutting edge 251 can be smoothly performed.

FIG. 14B is an enlarged view of an end portion of a drilling tool 260 in which the cutting insert 300 according to the third embodiment of the present invention is disposed. FIG. 14C is a view showing an inner cutting insert 300a and an outer cutting insert 300b which are overlapped along the radius of rotation in the drilling tool 260 of FIG. 14B.

An active cutting edge 251a of the inner cutting insert 300a and an active cutting edge 251b of the outer cutting insert 300b are overlapped and combined to form a composite cutting edge. In this case, the outer cutting insert 300b is disposed such that at least a portion 251b' of the active cutting edge 251b of the outer cutting insert 300b farthest from the longitudinal axis R is parallel to a ridge extension portion 315b of the outer cutting insert 300b.

Further, since a ridge extension portion 315a formed in the inner cutting insert 300a is adjacent to the longitudinal axis R and has a rotation speed which is close to 0, it does not substantially affect the drilling process. Further, when the inner cutting insert 300a and the outer cutting insert 300b are overlapped in the rotation direction, a ridge extension portion (not shown) arranged in a direction unsuitable for chip control in the outer cutting insert 300b is overlapped and covered by the inner cutting insert 300a. Thus, the ridge extension portion, which may interfere with chip control in the outer cutting insert 300b, is not involved in cutting during the drilling process.

Figure 15A:
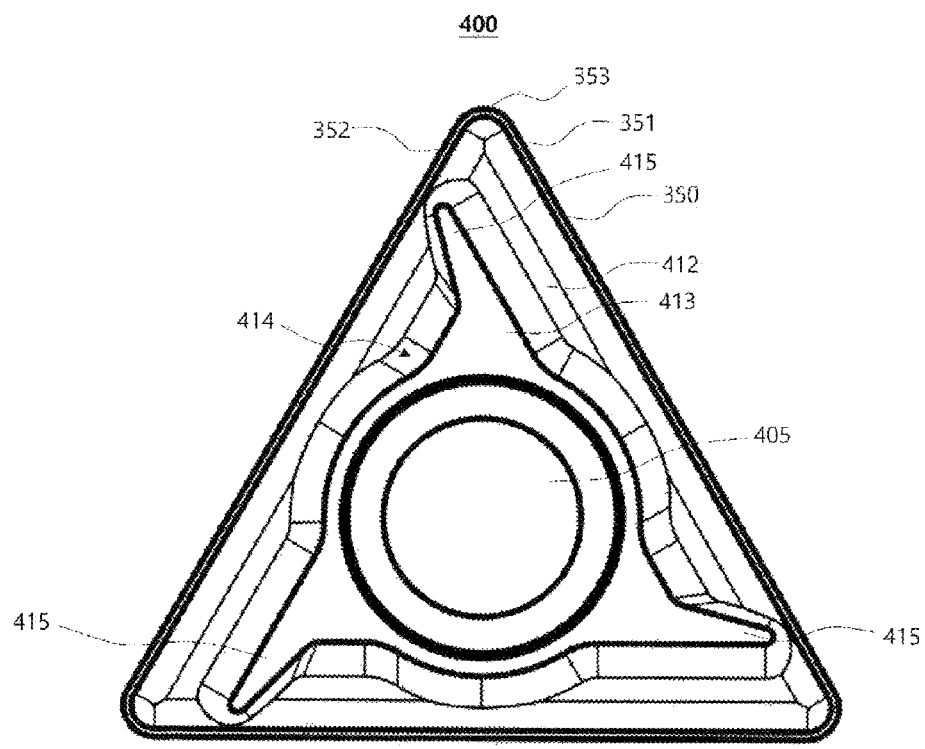
FIGS. 15A to 15C are views showing a cutting insert and a drilling tool according to a fourth embodiment of the present invention.
Figure 15B:
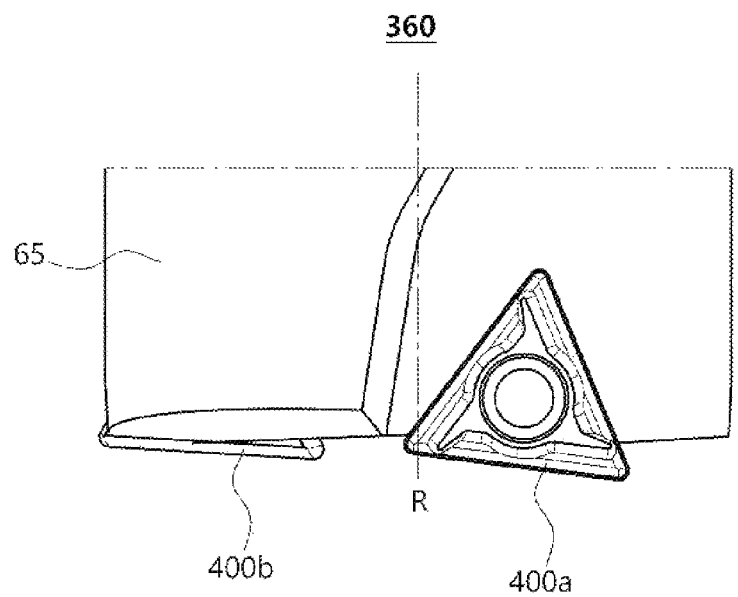
Figure 15C:
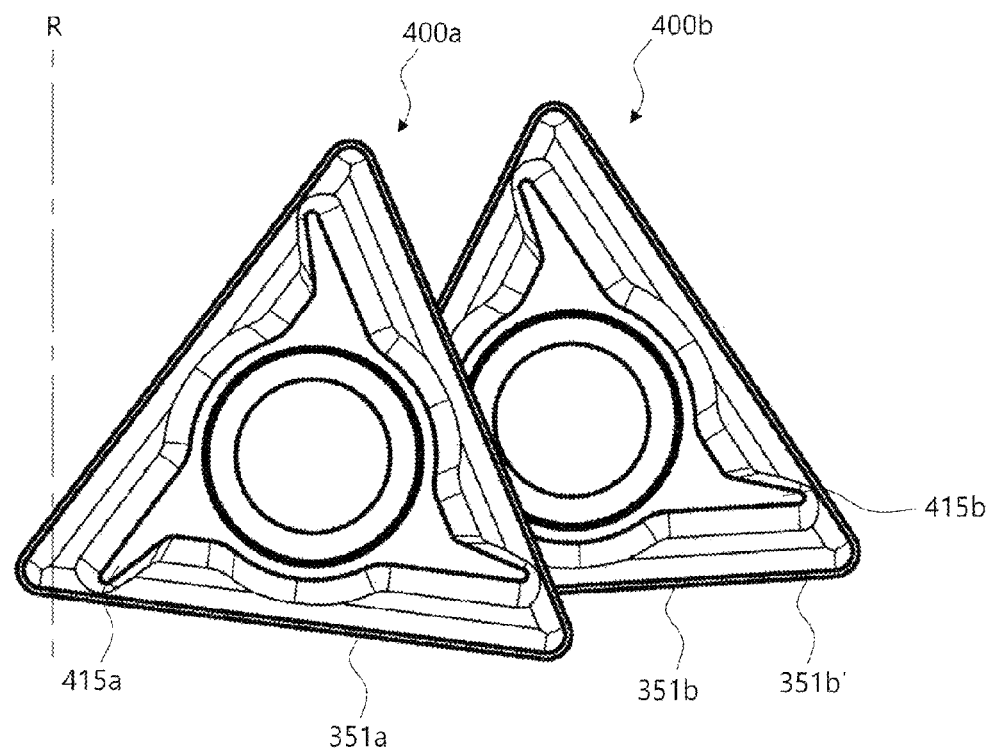

FIGS. 15A to 15C are views showing a cutting insert and a drilling tool according to a fourth embodiment of the present invention. FIG. 15A is a plan view of a cutting insert 400 having a substantially equilateral triangular shape.

The cutting insert 400 also includes a ridge portion 414 formed to protrude upward from the upper surface, and the ridge portion 414 includes a ridge body 413 spaced apart from a cutting edge 350 and disposed in a central portion 405 of the cutting insert and a ridge extension portion 415 extending from the vicinity of the corner of the ridge body 413 in a direction parallel to the cutting edge 350, in particular, a first cutting edge 351. Here, the ridge body 413 and the ridge extension portion 415 preferably have the same height with respect to the upper surface.

It is more preferable for controlling the chip cut and discharged by the first cutting edge 351 that a chip former 412 lower than the cutting edge 350 and the ridge extension portion 415 with respect to the upper surface is formed between the cutting edge 350, particularly, the first cutting edge 351 and the ridge extension portion 415 extending parallel to the first cutting edge 351, and the ridge extension portion 415 is formed to be higher than the cutting edge 350 with respect to the upper surface.

The cutting edge 350 includes the first cutting edge 351 and a second cutting edge 352 connected to the first cutting edge 351 at a corner cutting edge 353. The ridge extension portion 415 extends toward the second cutting edge 352 in a direction parallel to the first cutting edge 351 so that curling of the chip cut and discharged by the first cutting edge 351 can be smoothly performed.

FIG. 15B is an enlarged view of an end portion of a drilling tool 360 in which the cutting insert 400 according to the fourth embodiment of the present invention is disposed. FIG. 15C is a view showing an inner cutting insert 400a and an outer cutting insert 400b which are overlapped along the radius of rotation in the drilling tool 360 of FIG. 15B.

An active cutting edge 351a of the inner cutting insert 400a and an active cutting edge 351b of the outer cutting insert 400b are overlapped and combined to form a composite cutting edge. In this case, the outer cutting insert 400b is disposed such that at least a portion 351b' of the active cutting edge 351b of the outer cutting insert 400b farthest from the longitudinal axis R is parallel to a ridge extension portion 415b of the outer cutting insert 400b.

Further, since a ridge extension portion 415a formed in the inner cutting insert 400a is adjacent to the longitudinal axis R and has a rotation speed which is close to 0, it does not substantially affect the drilling process. Further, when the inner cutting insert 400a and the outer cutting insert 400b are overlapped in the rotation direction, a ridge extension portion (not shown) arranged in a direction unsuitable for chip control in the outer cutting insert 400b is overlapped and covered by the inner cutting insert 400a. Thus, the ridge extension portion, which may interfere with chip control in the outer cutting insert 400b, is not involved in cutting during the drilling process.

Although it has been described that two cutting inserts including the inner cutting inserts 100a, 200a, 300a and 400a and the outer cutting inserts 100b, 200b, 300b and 400b are disposed in the drilling tools 60, 160, 260 and 360, the present invention is not limited thereto and three or more cutting inserts may be disposed without departing from the scope of the invention.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive.

DESCRIPTIONS OF REFERENCE NUMERALS

50: cutting edge
51: major cutting edge
52: minor cutting edge
53: corner cutting edge
60: drilling tool
65: drill body
100: cutting insert
105: bore
110: upper surface
111: inclined surface
112: bottom surface
113: ridge body
114: ridge portion
115: ridge extension portion
116: notch
130: side surface
135: concave groove
150: lower surface

The invention claimed is:

1. A cutting insert for drilling, comprising:
an upper surface;
a lower surface formed on an opposite side of the upper surface;
a side surface connecting the upper surface and the lower surface;
a cutting edge formed at an intersection of the upper surface and the side surface and including a major cutting edge and a minor cutting edge connected to the major cutting edge at a corner cutting edge;
a ridge portion formed to protrude upward from the upper surface to facilitate chip control, wherein the ridge portion includes:
a ridge body spaced apart from the cutting edge and disposed at a central portion of the cutting insert for drilling; and
a ridge extension portion extending from a vicinity of a corner of the ridge body towards the minor cutting edge, in a direction parallel to the major cutting edge;
a first chip former formed between the major cutting edge and the ridge extension portion; and
a second chip former extending away from the corner cutting edge, along the minor cutting edge;
wherein:
in a plan view of the cutting insert, the ridge extension portion is asymmetric about an insert corner bisector (B1) passing through the corner cutting edge;
in said plan view, the ridge extension portion overlaps the second chip former at a location proximate to, but spaced apart from, said corner cutting edge; and
a gap space is formed between an end of the ridge extension portion and the minor cutting edge in order not to interrupt continuity of said minor edge.

2. The cutting insert of claim 1, wherein the ridge body and the ridge extension portion are equal in height, with respect to the upper surface.

3. The cutting insert of claim 1, wherein the first chip former is lower than the cutting edge and the ridge extension portion with respect to the upper surface, and extends parallel to the major cutting edge, and wherein the ridge extension portion is higher than the major cutting edge with respect to the upper surface.

4. The cutting insert of claim 1, wherein, in said plan view of the cutting insert, the ridge extension portion has a width decreasing from the ridge body toward said end of the ridge extension portion, the width being measured in a direction perpendicular to the first major cutting edge.

5. The cutting insert of claim 1, wherein the ridge portion has a shape which tapers in an upward direction from the upper surface of the cutting insert to an upper side of the ridge portion.

6. The cutting insert of claim 1, wherein the ridge body surrounds a bore passing through from the upper surface to the lower surface, and an edge of the bore forms an inner closed curve of the ridge body.

7. A drilling tool comprising:
a drill body rotatable about a longitudinal axis; and
at least one inner cutting insert and at least one outer cutting insert identical to the inner cutting insert and disposed outwardly in a radial direction, each of the inner cutting insert and the outer cutting insert, comprising:
an upper surface;
a lower surface formed on an opposite side of the upper surface;
a side surface connecting the upper surface and the lower surface;
a peripherally extending cutting edge formed at an intersection of the upper surface and the side surface, the peripherally extending cutting edge including an active cutting edge which is axially forwardmost along the longitudinal axis and a minor cutting edge connected to the active cutting edge at a corner cutting edge;
a ridge portion formed to protrude upward from the upper surface to facilitate chip control, wherein the ridge portion includes:
a ridge body spaced apart from the cutting edge and disposed at a central portion of the cutting insert; and
a ridge extension portion extending from a vicinity of a corner of the ridge body towards the minor cutting edge, in a direction parallel to the active cutting edge; and
a first chip former formed between the active cutting edge and the ridge extension portion;
wherein:
in a plan view of the cutting insert, the ridge extension portion is asymmetric about an insert corner bisector (B1) passing through the corner cutting edge; and
the ridge extension portion overlaps a second chip former extending along the minor cutting edge, in an axially rearward direction from the corner cutting edge which is positioned axially forward along the longitudinal axis and radially outward with respect to the longitudinal axis, the ridge extension portion overlapping the second chip former at a location proximate to but spaced apart from, said corner cutting edge.

8. The drilling tool of claim 7, wherein the active cutting edge of the inner cutting insert and the active cutting edge of the outer cutting insert are combined to form a composite cutting edge.

9. The drilling tool of claim 8, wherein the outer cutting insert is disposed such that at least a portion of the active cutting edge of the outer cutting insert farthest from the longitudinal axis is parallel to the ridge extension portion of the outer cutting insert.

10. The drilling tool of claim 8, wherein the inner cutting insert is mounted on the drill body such that a ridge extension portion formed in the inner cutting insert and adjacent to the longitudinal axis has a direction parallel to a cutting edge extended from the composite cutting edge and adjacent to the longitudinal axis.

11. The drilling tool of claim 8, wherein when the inner cutting insert and the outer cutting insert are overlapped in a rotation direction, the ridge extension portion formed in the outer cutting insert is overlapped and covered by the inner cutting insert.

12. The drilling tool of claim 8, wherein the composite cutting edge protrudes further in a drilling direction at a portion where the active cutting edge of the inner cutting insert and the active cutting edge of the outer cutting insert overlap each other, than in a vicinity of the longitudinal axis and also at a radially outer portion of the active cutting edge of the outer cutting insert.

13. A drilling insert, comprising:
an upper surface;
a lower surface formed on an opposite side of the upper surface;
a side surface connecting the upper surface and the lower surface;
a cutting edge formed at an intersection of the upper surface and the side surface, the cutting edge including a major cutting edge and a minor cutting edge connected to the major cutting edge at a corner cutting edge;
a ridge portion formed to protrude upward from the upper surface to facilitate chip control, the ridge portion comprising:
  a ridge body spaced apart from the cutting edge and disposed at a central portion of the drilling insert; and
  a ridge extension portion extending from a vicinity of a corner of the ridge body in a direction parallel to the major cutting edge, and toward the minor cutting edge;
a first chip former formed between the major cutting edge and the ridge extension portion, the first chip former being lower than the major cutting edge and the ridge extension portion with respect to the upper surface; and
a second chip former extending away from the corner cutting edge, along the minor cutting edge;
wherein:
the first chip former extends to the minor cutting edge;
in a plan view of the drilling insert, the ridge extension portion is asymmetric about an insert corner bisector (B1) passing through the corner cutting edge;
in said plan view, the ridge extension portion overlaps the second chip former at a location proximate to, but spaced apart from, said corner cutting edge; and
a gap space is formed between an end of the ridge extension portion and the minor cutting edge in order not to interrupt continuity of said minor cutting edge.

14. The drilling insert according to claim 13, wherein:
a width of the first chip former between the ridge body and the major cutting edge is substantially the same as a width of the first chip former between the ridge extension and the major cutting edge.

15. The drilling insert according to claim 14, wherein:
the ridge body and the ridge extension portion are equal in height, with respect to the upper surface; and
the ridge extension portion is higher than the major cutting edge with respect to the upper surface.

16. The cutting insert of claim 13, wherein:
in a plan view of the cutting insert, the ridge extension portion has a width decreasing from the ridge body toward the end of the ridge extension portion, the width being measured in a direction perpendicular to the major cutting edge.

17. The cutting insert of claim 16, wherein:
the ridge portion has a shape which tapers in an upward direction from the upper surface of the cutting insert to an upper side of the ridge portion.

18. A drilling insert, comprising:
an upper surface;
a lower surface formed on an opposite side of the upper surface;
a side surface connecting the upper surface and the lower surface;
a cutting edge formed at an intersection of the upper surface and the side surface, the cutting edge including a first number of major cutting edges and a first number of minor cutting edges, each major cutting edge connected to an associated one of the minor cutting edges, at a corner cutting edge;
a ridge portion formed to protrude upward from the upper surface to facilitate chip control, the ridge portion comprising:
  a ridge body spaced apart from the cutting edge and disposed at a central portion of the drilling insert, the ridge body having a first number of corners; and
  a ridge extension portion extending from a vicinity of each of the corners of the ridge body, said ridge extension portion extending in a direction parallel to an adjacent one of the major cutting edges, and towards an associated one of the minor cutting edges;
a first chip former formed between each major cutting edge and the adjacent ridge extension portion, the first chip former being lower than said each major cutting edge and the adjacent ridge extension portion with respect to the upper surface; and
a second chip former extending away from the corner cutting edge, along the minor cutting edge;
wherein:
the first chip former extends to the minor cutting edge;
the insert has an equal number of corners of the ridge body, ridge extension portions, major cutting edges and minor cutting edges;
each and every ridge extension portion extends from exactly one of the corners of the ridge body;
in a plan view of the drilling insert, each ridge extension portion is asymmetric about an insert corner bisector (B1) passing through an associated corner cutting edge;
in said plan view, the ridge extension portion overlaps the second chip former at a location proximate to, but spaced apart from, said corner cutting edge; and
a gap space is formed between an end of each ridge extension portion and an associated minor cutting edge in order not to interrupt continuity of said associated minor cutting edge.

19. The drilling insert of claim 18, wherein:
each ridge extension portion has a proximate edge which borders a proximate inclined surface;
the proximate edge and the proximate inclined surface face the associated major cutting edge and are spaced apart therefrom by the first chip former; and
along their entire lengths, the proximate edge and the proximate inclined surface are parallel to the associated major cutting edge and extend to a vicinity of the associated minor cutting edge.

20. The cutting insert of claim 1, wherein:

the ridge extension portion has a proximate edge which borders a proximate inclined surface;

the proximate edge and the proximate inclined surface face the major cutting edge and are spaced apart therefrom by a first chip former; and along their entire lengths, the proximate edge and the proximate inclined surface are parallel to the major cutting edge and extend to a vicinity of the associated minor cutting edge.

21. The drilling insert of claim 13, wherein:

the ridge extension portion has a proximate edge which borders a proximate inclined surface;

the proximate edge and the proximate inclined surface face the major cutting edge and are spaced apart therefrom by the first chip former; and along their entire lengths, the proximate edge and the proximate inclined surface are parallel to the major cutting edge and extend to a vicinity of the associated minor cutting edge.

* * * * *